United States Patent [19]

Vozoff

[11] 4,349,781
[45] Sep. 14, 1982

[54] SUPERCONDUCTING GRADIOMETER-MAGNETOMETER ARRAY FOR MAGNETOTELLURIC LOGGING

[75] Inventor: Keeva Vozoff, Roseville, Australia

[73] Assignee: The Regents of the University of California, Berkeley, Calif.

[21] Appl. No.: 109,780

[22] Filed: Jan. 7, 1980

[51] Int. Cl.³ .................... G01V 3/26; G01R 33/035
[52] U.S. Cl. .................... 324/346; 324/248; 324/350
[58] Field of Search ............... 324/339, 345, 346, 350, 324/248

[56] References Cited

U.S. PATENT DOCUMENTS

| | | | |
|---|---|---|---|
| 2,677,801 | 5/1954 | Cagniard | 324/350 |
| 3,422,345 | 1/1969 | Muse | 324/350 |
| 3,829,768 | 8/1974 | Nicol et al. | 324/248 |
| 3,982,176 | 9/1976 | Meador | 324/339 X |
| 3,993,944 | 11/1976 | Meador et al. | 324/339 X |

FOREIGN PATENT DOCUMENTS 197202  5/1967  U.S.S.R. ............................ 324/346

OTHER PUBLICATIONS

Fraser-Smith, A.C., "*Geophys. App. of Superconducting... Gradiometers*" Geophysics, vol. 41, No. 2, Apr. 1976.
Wynn et al., "Advanced Superconducting Gradiometer/Magnetometer Arrays . . . ", IEEE Trans. on Magnetics, vol. MAG-11, No. 2, Mar. 1975, pp. 701-707.
Vozoff, Keeva, The Magnetotelluric Method in the Exploration of Sedimentary Basins, Geophysics, vol. 37, No. 1, Feb. 1972, pp. 98-141.

*Primary Examiner*—Gerard R. Strecker
*Attorney, Agent, or Firm*—Flehr, Hohbach, Test, Albritton & Herbert

[57] ABSTRACT

A subsurface electromagnetic sensing device for use in boreholes and mine shafts which includes a sonde for lowering underground which is supercooled and contains Squid gradiometers for measuring vector current density, and magnetometers for measuring vector magnetic fields. When these measured values are combined, information is obtained to construct a conductivity model of the underlying and surrounding subsurface region.

7 Claims, 5 Drawing Figures

SUPERCONDUCTING GRADIOMETER-MAGNETOMETER ARRAY FOR MAGNETOTELLURIC LOGGING

The present invention is directed to a subsurface electromagnetic sensing device and more particularly to a device for use in such applications as borehole logging and in general geophysical exploration such as in a borehole, a mine shaft, or on a sea bottom; in other words, subsurface exploration.

Well logs have been in use for a longer period of time to obtain many facets of information concerning the configuration of subsurface ore bodies or oil deposits. For example, in an oil deposit if resistivity can be measured, the oil will have a much higher resistivity than the normally associated water or brine. And in an ore body, it is commonly more conductive than the remaining adjacent subsurface. Underground techniques are still lacking in sensitivity and quality of information. For example in a conventional conductivity log the well itself affects the measurement of formation conductivity. Also structures relatively far from the well cannot be detected.

Above ground techniques are used to obtain information concerning the configuration of subsurface ore bodies or oil deposits.

One prior art technique which is somewhat similar in concept to the present invention but is solely limited to above ground use is the magnetotelluric method of geophysical exploration. Here, the tensor impedance of the earth to electromagnetic fields of external origin is measured on the earth's surface. This is done by setting out two directional magnetometers along perpendicular horizontal axes, and two horizontal antennas, usually along the same axes as the magnetometers. The magnetometers measure magnetic field variations and the antennas measure electric field variations, both in a frequency range of interest. Depending on the application, these frequencies can be as low as $10^{-4}$ Hz or as high as $10^{+5}$ Hz. The kind of magnetometer used (fluxgate, induction coil, Squid, to name three) will depend on the frequency range and the environment. The antenna consists of a length of wire electrically grounded at both ends. The length may be a kilometer or more at low frequencies, but must be shorter at high frequencies because of the effect of its capacitance to earth on its output signal. This length is rarely less than 10 or 15 meters because the signal produced in a short antenna is proportional to its length. For that reason it has not been practical to make magnetotelluric measurement in boreholes. However, there are several applications in which it would be desirable to be able to make such measurements. Some of these arise in exploration for petroleum and other minerals, and in mapping geological structure in the subsurface. This method is discussed in an article entitled "THE MAGNETOTELLURIC METHOD IN THE EXPLORATION OF SEDIMENTARY BASINS" by the inventor in *GEOPHYSICS*, Vol. 37, No. 1, February 1972, pages 98-141.

Another technique which uses superconducting gradiometer/magnetometer arrays is discussed in the IEEE Transactions on Magnetics, Vol. MAG-11, #2, March 1975 by Wynn et al. Here a special array simultaneously measures five independent spatial gradients of a magnetic field, which is effectively static and in essence requires a magnetic source; in other words, the time rate of change of the magnetic field is zero in that case, whereas it is different from zero in the present invention. Wynn depends only on contrasts in magnetic permeability as opposed to electrical conductivity.

It is similar in that, as in the present invention, it uses superconducting gradiometers and magnetometers in combination to derive certain information concerning a magnetic field. Though the article suggests that one of the device's capabilities is in characterizing geological structures, its main applicability appears to lie in biological studies such as heart modeling investigations. However, satellite monitoring of the earth's magnetic field is also suggested.

It is therefore a general object of the present invention to provide a device for magnetotelluric measurements beneath the surface.

In accordance with the above object, there is provided a subsurface electromagnetic sensing device where the electrical conductivity of a portion of the subsurface is known. It comprises supercooled vessel means for subsurface use containing magnetic gradiometer means for measuring at least one horizontal component of vector current density in the adjacent subsurface. The vessel also contains magnetometer means for measuring horizontal magnetic field components in at least one direction perpendicular to the vector current density. Finally, there are means for utilizing the above measured and determined quantities, including the electrical conductivity in the immediate vicinity of the vessel as a function of frequency of the electromagnetic field for determining the impedance of the underlying and surrounding subsurface region as a function of frequency.

Figure 1:
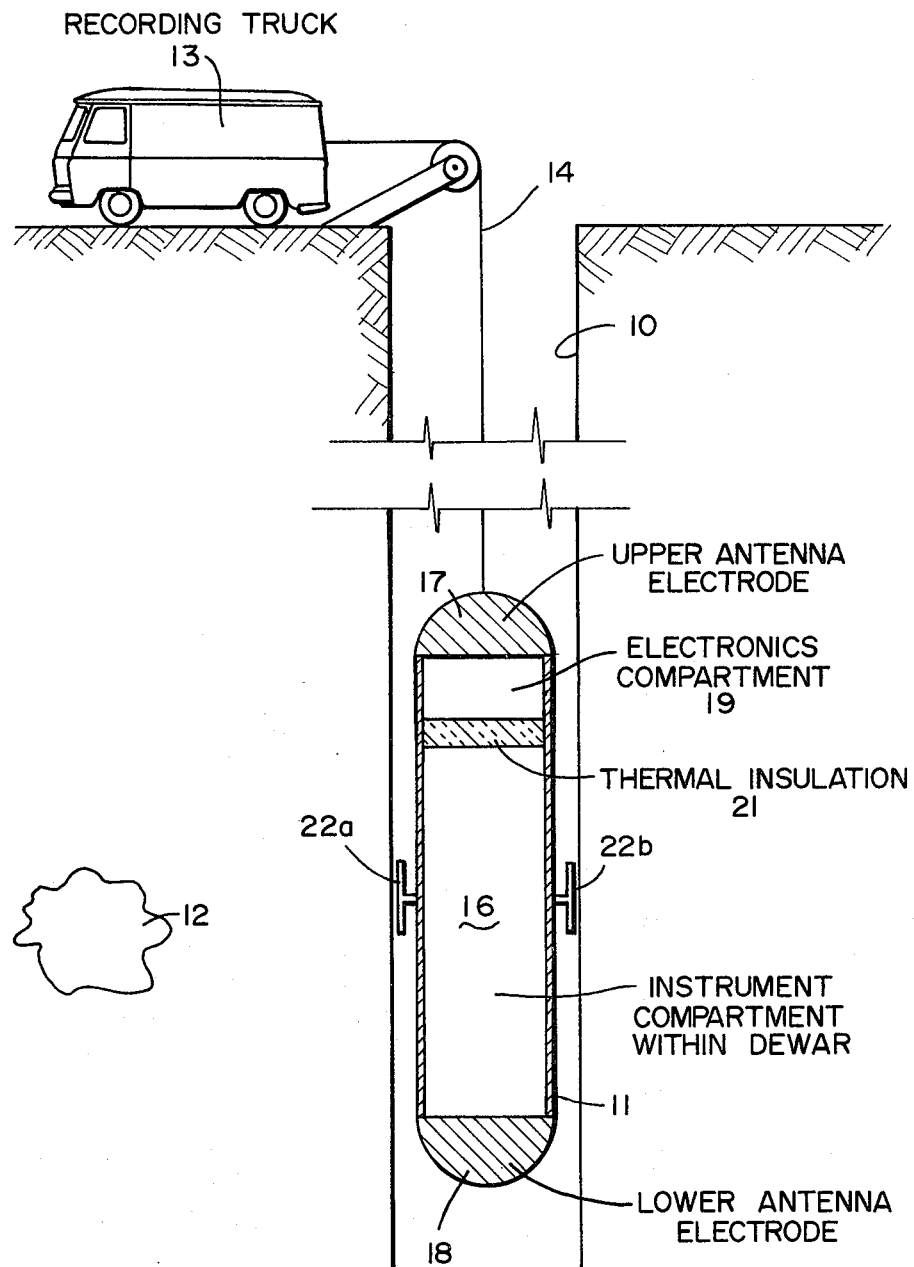
FIG. 1 is a simplified cross-sectional view showing the application of the present invention in a borehole.

FIG. 1 illustrates a typical application of the invention where a borehole 10 has lowered in it the sonde 11 which contains the various electrical instrumentation for sensing and in the final analysis providing a conductivity model of the adjacent subsurface 12. Such subsurface is effectively everything outside of sonde 11 and is shown in FIG. 1 by the representation 12 which might include an ore deposit or oil-bearing porous rock. Sonde 11 is connected to a recording truck 13 by a cable 14 which in addition to electrical interconnections might include suitable helium interconnections in order to maintain the sensing instruments at a supercooled temperature if there is no internal supply of helium.

In general the sonde 11 has a supercooled instrument compartment 16 which is within a dewar and upper and lower electrodes 17 and 18 which are located at the vertical extremities of the sonde 11. These are exposed to the mud in the borehole and made of a nonmagnetic material. There is a general electronics compartment 19 which is thermally isolated by thermal insulation 21 from the supercooled portion of the sonde 11.

In operation, the sonde 11 containing the instruments and electronics is lowered into the borehole to the bottom or other depth desired. It is then stabilized by stabilizers 22a, 22b to prevent it moving in the earth's static magnetic field. Signals from the sensors, including reference sensors at the surface, if available, are recorded for a time duration equal to several times the longest period of interest. For example, if the longest period is 50 seconds, then the signal should be recorded for at least 200 seconds. Recorded data are then processed using magnetotelluric processing schemes to derive the electric and magnetic field vectors and tensor impedance and the induction vector (Tipper) all as functions of frequency, as well be described below. An electric field Tipper is also computed which is related to electric field intensity in the vertical, Z, direction along with field strength in the horizontal plane, for example, the X and Y directions.

Once the data are complete at the first depth, the sonde is moved vertically by a distance which depends on the nature of the geological problem. Data acquisition is then started again. Natural electromagnetic field signals, for example, typically having frequencies from 0.1 to 10 Hz are used. But such signals change in amplitude with time in an unpredictable way. Where the natural signals available at the desired frequency are too weak to allow usable data to be obtained such as under seawater or under a great depth of conductive rock, an intense artificial source of electromagnetic field may be substituted at the surface or on the sea floor.

After the above data acquisition the sonde 11 is removed and a standard conductivity log is made. This is a well log which provides both the conductivity, $\sigma_s$, of the borehole and a true conductivity, $\sigma_t$, of the nearby rock which is in an undisturbed state (i.e., before drilling), as for example explained in the 1972 Edition of a publication of Schlumberger Limited, New York, N.Y., entitled "Log Interpretation". Such publication shows commercial well logging methods known as a Caliper Log and a Dual Induction Laterolog. The second is one suitable type of conductivity log.

Figure 2:
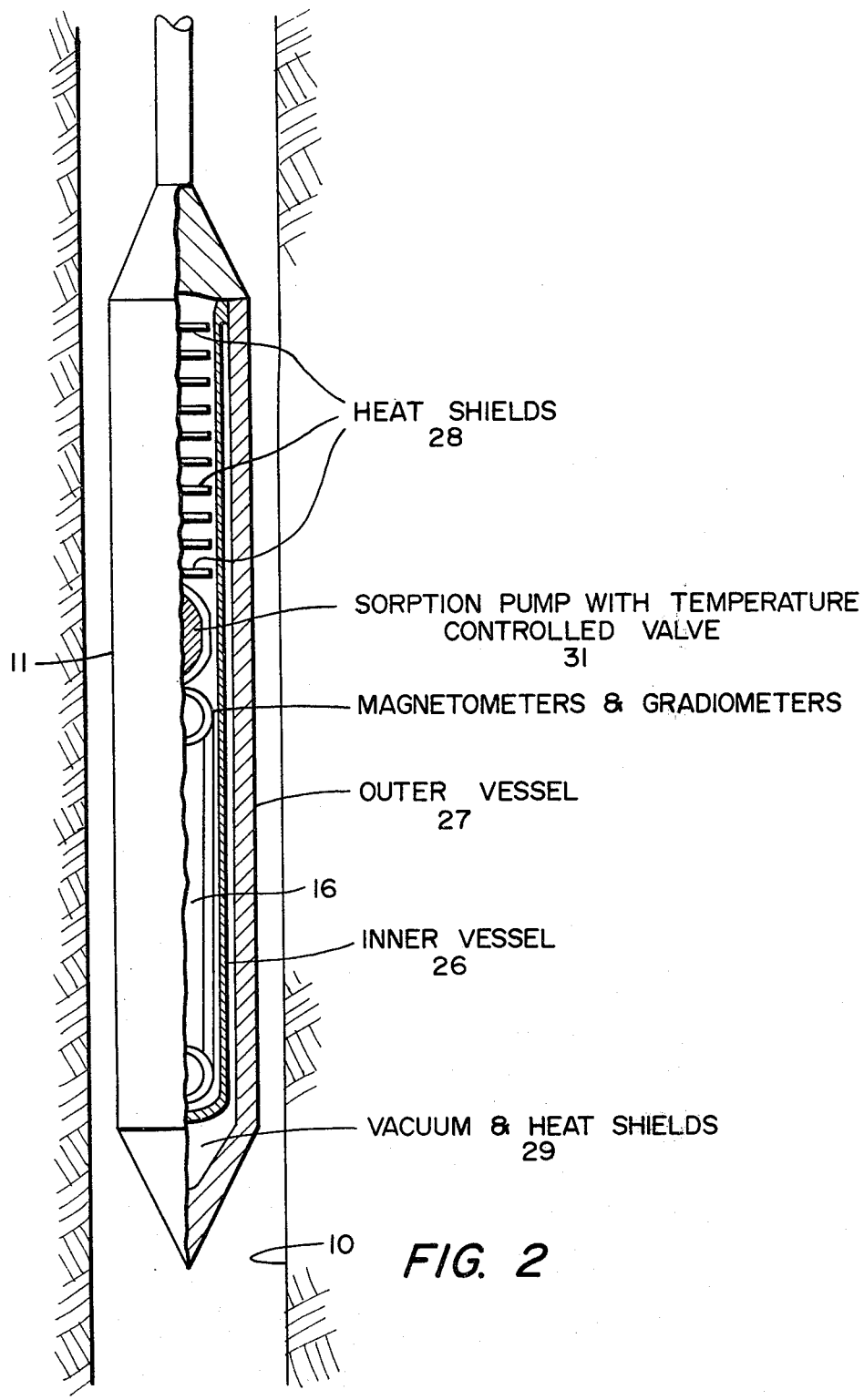
FIG. 2 is an enlarged cross-sectional view of the downhole portion of FIG. 1.

FIG. 2 illustrates internal details of sonde 11. It is in essence a cryostat which must be of special design in order to withstand the high pressures and temperatures encountered in deep wells. Materials can be used such as beryllium in a wall thickness appropriate to the pressure anticipated. In general, sonde 11 includes the cryostatic compartment 16 which has both an inner vessel 26 and an outer vessel 27. Included in this compartment are the various magnetometers and gradiometers used in the present invention. Vacuum and heat shields are provided both at the upper end 28 and lower end 29 of the sonde. A sorption pump 31 is provided with a temperature control valve to regulate temperature below 6° K. Specifically, helium can be pumped by the sorption pump connected to the helium space within the inner vessel and regulated by the control valve. The control signal for the valve is derived from a temperature sensor connected to a Josephson junction detector. In this way, the temperature is maintained until the helium is consumed. Temperature control minimizes the major possible source of error in the instruments since the major noise source for a Squid (an acronym for Superconducting Quantum Interference Device) is a change in the critical current of the Josephson junction caused by fluctuation in temperature of the helium bath. An alternative technique of temperature control is the maintaining of a subatmospheric pressure in a flexible exhaust tube contained in the cable 14 by which the instrument is suspended. Temperature at the Josephson junction is compared with that desired, and the difference is used to control a gas flow valve in a helium space. The control apparatus is located at the dewar to reduce time lag in the response of the regulation system. This method is useful when it is necessary for the device to remain in the well for long periods of time.

Figure 3:
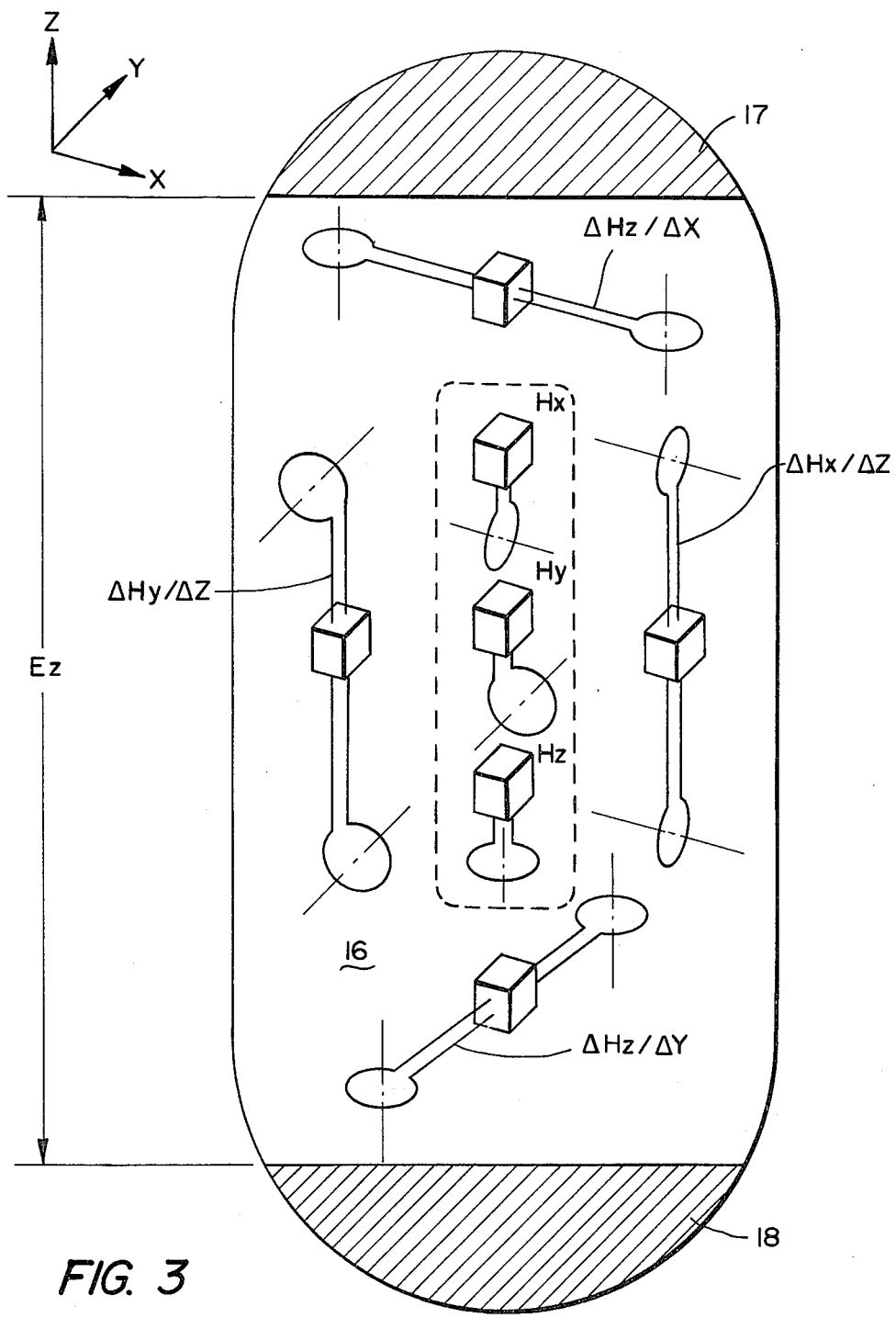
FIG. 3 is a diagrammatic view illustrating FIG. 2 in greater detail.

FIG. 3 illustrates the various electromagnetic field sensing devices contained in compartment 16 in sonde 11. Basically, there are three magnetometers designated $H_x$, $H_y$, and $H_z$ for measuring the magnetic components in the respective directions and there are four gradiometers, each of which consist of a pair of pickup coils for measuring components of the current density in the manner described below. Actually the gradiometer is identical to a superconducting mangetometer except for the input circuit which uses two coils connected in a field differencing configuration in place of the single coil of the magnetometer. Each gradiometer has its measurement designated as for example $\Delta H_z/\Delta x$, which measures the change in the x- direction of the magnetic field in the Z direction. The other three pairs are similarly designated. One gradiometer measurement is subtracted from the other and this will produce a component of the current density, j. This information, when used in conjunction with the resistivity log gives a component of horizontal electric field. These, with the components of magnetic field provide sufficient information for impedance modeling of the adjacent subsurface geological structure.

From a theoretical standpoint, the following is the technique in which the sensed information is processed and utilized. Maxwell's equations governing the behavior of electromagnetic fields state that, at low frequency, $$\Delta \times \overline{H}(\omega) = \overline{j}(\omega) \tag{1}$$

$$\overline{j}(\omega) = \overline{E}(\omega)\sigma \tag{2}$$

where $\overline{H}(\omega)$ is the vector magnetic field at angular frequency $\omega$, $\overline{j}(\omega)$ is the vector current density, $\overline{E}(\omega)$ is the electric field, $\sigma$ is the electrical conductivity at the location where j or E is measured, and all units are in the System Internationale. In the following the ($\omega$) will be understood for E, H, and j components. By the use of the Squid gradiometers, the components of j can be determined as can be seen by separating the vector equation (1) into its three component equations:

$$\frac{\partial H_z}{\partial y} - \frac{\partial H_y}{\partial z} = j_x \tag{1a}$$

$$\frac{\partial H_x}{\partial z} - \frac{\partial H_z}{\partial x} = j_y \tag{1b}$$

$$\frac{\partial H_y}{\partial x} - \frac{\partial H_x}{\partial y} = j_z \tag{1c}$$

where x and y are two orthogonal horizontal directions and z is vertically downward. The set is chosen to form a right-hand cartesian coordinate system.

It will be apparent from later discussion that equations (1a) and (1b) are critical to mapping the subsurface impedance and equation (1c) is somewhat redundant but may be used for some purposes.

The instrument system of FIG. 3 which includes four gradiometers provides the four partial derivatives required for equations (1a) and (1b), to thus provide $j_x$ and $j_y$.

Figure 4:
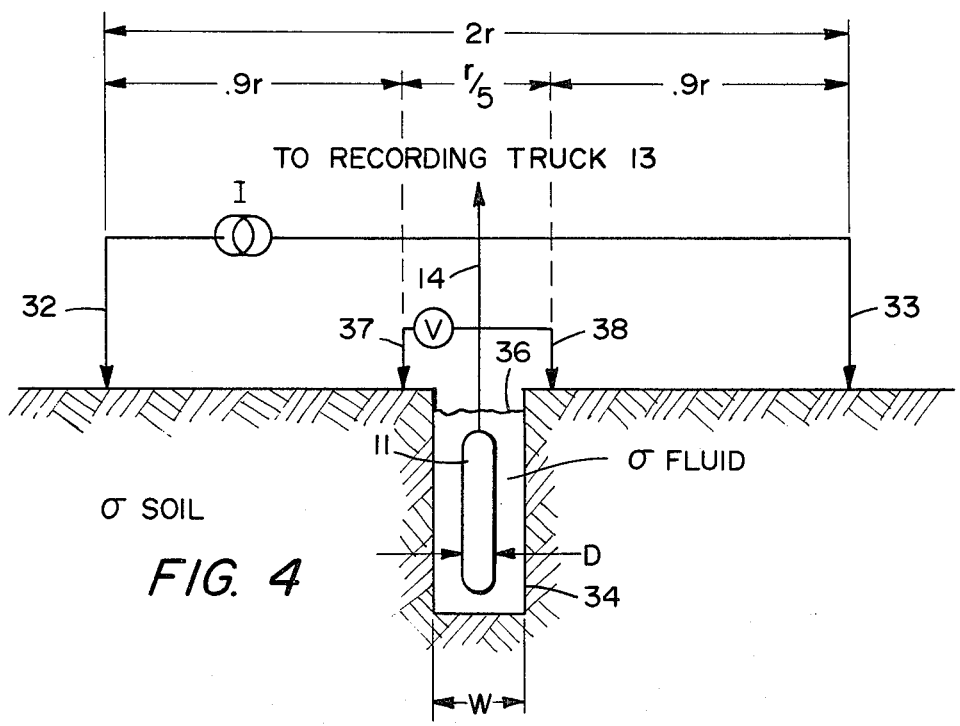
FIG. 4 is a diagrammatic view of a calibration set-up for a particular sonde.

In practice $j_x$ and $j_y$ measured at the sonde may differ from their true value at the same depth away from the well because of the conductivity difference between the borehole region and the surrounding rock. This is known to occur as a result of the well-drilling procedure. Thus the calibration procedure of FIG. 4 must be applied for some situations.

Figure 5:
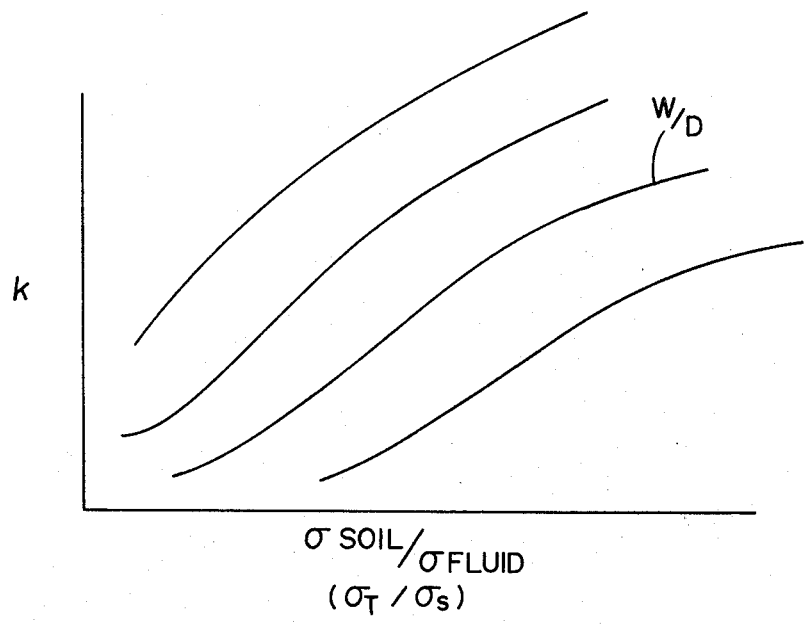
FIG. 5 is a family of curves resulting from the calibration of FIG. 4.

Here a horizontal D.C. electric field is artificially applied by current generator, I, and probes 32 and 33 which penetrate the soil of the test site and are placed a distance 2r apart. A shallow well 34 is dug and filled with fluid 36 having a conductivity, $\sigma_{FLUID}$. The conductivity of the soil, $\sigma_{SOIL}$, can easily be determined by taking the ratio (I/V) and dividing by ($2\pi r$). Sonde 11 (with a diameter, D) is lowered into the well and the current, I, and voltage V is measured across the probes 37 and 38 which are adjacent the well. Such probes are spaced a distance 10 times less than probes 32, 33, 2r, as shown. On instrumentation line 14, $j_x^o$, is measured (see equation 1a). Since the true soil conductivity is known and the electric field can be calculated by the V measurement and the distance between probes 37 and 38 then by equation (2) ($j = E\sigma$) the true vector current density, $j_x^t$, can be calculated. Then $$\frac{j_x^t}{j_x^o} = k \quad (3)$$

where k is a correction factor. However this factor applies only to a particular fluid conductivity, $\sigma_{FLUID}$, and well size W. Thus to obtain a family of "k's" the foregoing procedure is repeated with different size wells, W, and fluid conductivities to produce the curves of FIG. 5. Here the parameter of the curves is W/D (well diameter/sonde diameter). In general the calibration curves of FIG. 5 would have its derived values clustered around those same sizes which are to be surveyed.

Next at the survey site itself commercial well logs are made such as the "Dual Induction Laterolog" and the Caliper Log discussed above which provide for each measured depth, $\sigma_s$, the conductivity in the borehole and $\sigma_t$, the true conductivity of the surrounding subsurface before it was disturbed by drilling, as well as actual well diameter, W. Since the correction factor, k, is a function of W/D and $\sigma_t/\sigma_s$ as indicated on the horizontal coordinate of FIG. 5, a particular k is selected. Then since $\sigma_t$ is known at that depth from the induction log, information about the true electric field is calculated by, $$E_x^t = \frac{j_x^o \times k}{\sigma_t} \quad (4)$$

The same technique is used for converting the measurement, $j_y^o$, to $E_y^t$. Within the frequency ranges of interest the foregoing corrections are independent of frequency.

Since the foregoing "k" correction factor ma be a second order effect in many circumstances, both $E_x$ and $E_y$ may optionally be determined from the simplified form of equation (4), viz., $$E_x = \frac{j_x}{\sigma_t} \; ; E_y = \frac{j_y}{\sigma_t}$$

Since $E_x$ and $E_y$ have now been derived and since $H_x$ and $H_y$ have been previously measured, with the use of these four factors, viz, $E_x$, $E_y$, $H_x$, $H_y$, which are all as a function of frequency and well known per se in magnetotelluric techniques, impedance modelling can be made on that particular plane at which the sonde was located for the test. Namely, $Z_{xx}$, $Z_{xy}$, $Z_{yx}$, and $Z_{yy}$ may be computed. In general natural electromagnetic source fields extending over a broad frequency range impinge on the earth's surface. They propagate vertically downward, attenuating exponentially as telluric currents are induced. When field components are spectrum-analyzed, the complex ratio of the horizontal electric (E) and magnetic (H) fields at each frequency ($\omega$) is an impedance, $\underline{Z}(\omega)$.

$$\overline{E}(\omega) = \underline{Z}(\omega)\overline{H}(\omega)$$

Z is the tensor impedance presented by the earth to the electromagnetic wave. It is interpreted through models to give conductivity vs. depth, as well as lateral variations where indicated.

This technique of modeling is well-known and is discussed in the *Geophysics*' article by the inventor.

Additional measurements which can be made are those of $H_z$ and $E_z$. $H_z$ is made by an additional Squid magnetometer within the sonde or vessel 11. $E_z$ is measured by means of the vertical antenna 17, 18. $H_z$ in combination with $H_x$ and $H_y$ provides the Tipper or induction vector which is a well known measurement. An electric field Tipper is provided by $E_z$ in combination with $H_x$ and $H_y$; the same is true of $E_x$ and $E_y$.

The ratio of signal to noise can be effectively enhanced by employing the "remote reference" measurement scheme, in which the signals recorded simultaneously in a pair of magnetometers within 5-10 km are used in the data processing stage to reject contributions to the field which are not common to both sets of instruments.

In many simple situations $H_z$ is much smaller than $H_x$ or $H_y$, so that $j_x$ will be approximately $(-\partial H_y/\partial z)$ and $j_y$ will be approximately $(-\partial H_x/\partial z)$. In that case it is not necessary to measure $(\partial H_z/\partial y)$ or $(\partial H_z/\partial x)$.

Typical values are
$\sigma = 0.03$ s/m
$E_x = 10^{-6}$ v/m
$j_x = 3 \times 10^{-8}$ a/m$^2$.

Then if $-\partial H_y/\partial z$ is nearly equal to $j_x$, in practical units this is approximately $1-2 \times 10^{-5}$ nanoteslas/m.

Since most Squid gradiometers actually measure the difference in magnetic field between two loops as shown in FIG. 3, the "delta" measurements are substantially equivalent to the desired partial derivative. Of course the larger the delta which can be achieved, the greater the sensitivity. Horizontal dimensions are restricted when operating in a borehole. Oil wells may be a small as 17 cm in diameter and mineral exploration bores may be smaller. However, the sensitivity of gradiometers in a 10 cm borehole should be sufficient.

Gradiometers and magnetometers of the general type discussed above are obtainable commercially from the S.H.E. Corporation, 4174 Sorrento Valley Boulevard, San Diego, Calif. In addition, such company in its products brochure discusses in general the use of superconducting gradiometers when combined with magnetic field measurements for providing geophysical information.

However, the present concept differs from others proposed or in use which employ magnetometers and gradiometers in combination. The difference is that the currents and electric fields j and E are induced by the time variations $$\frac{\partial H_x}{\partial t}, \frac{\partial H_y}{\partial t}, \text{ and } \frac{\partial H_z}{\partial t},$$

according to the second of Maxwell's Equations $$\nabla \times E = -\mu \frac{\partial H}{\partial t}$$

In other methods it is assumed that the components of H do not vary with time, any such variation being noise and interfering with the measurement. In those methods the spatial changes in the H components are due to irregular distributions of magnetic materials such as iron. Additionally, these other methods are not suggested for downhole use nor is $\sigma$, the electrical conductivity required.

With the improved device of the present invention, especially when used with natural field signals in a borehole or mine opening, the device has the advantage over conventional electric logging and induction logging in that it samples much further into the adjacent rock which is undisturbed by the borehole. This is a serious limitation of conventional borehole logs since the drilling operation may change physical conditions over a radius of many meters. However, the improved sensitivity of the device of the present invention especially when using superconducting Squid gradiometers and magnetometers provides for a greatly increased area of coverage beyond the disturbed portion of the borehole. In addition, the device of the present invention has a fundamental advantage over measurements at the surface such as previously done by magnetotelluric methods. That is, by operating at a depth close to the zone of interest, the relative signals from the zones are increased since they do not undergo the attenuations suffered in returning to the surface.

What is claimed is:

1. A subsurface electromagnetic field sensing device where the electrical conductivity of a portion of said subsurface is known comprising: supercooled vessel means for subsurface use containing magnetic gradiometer means for measuring at least one horizontal component of vector current density in the adjacent subsurface and containing magnetometer means for measuring a horizontal magnetic field component in at least one perpendicular direction relative to said vector current density; and means for utilizing said measured and determined quantities, as a function of frequency of the electromagnetic field, including said electrical conductivity in the immediate vicinity of said vessel, for determining the impedance of said underlying and surrounding subsurface region.

2. A device as in claim 1 where said vector current density is measured in two horizontal orthogonal directions and vector magnetic fields are measured in two horizontal perpendicular directions.

3. A device as in claim 1 where said utilizing means computes an electric field vector, E, by use of said measured vector current density and conductivity.

4. A device as in claim 1 where said vessel means is elongated in a vertical direction and including antenna means for sensing a voltage gradient in said vertical direction.

5. A device as in claim 1 including means for calibrating said vessel means.

6. A method of determining the electrical impedance of subsurface material beneath the ground or at the ocean floor and at a considerable distance from a vessel containing supercooled measuring instruments including magnetic gradiometers and magnetometers, and where a natural or imposed varying electromagnetic field is present comprising the following steps:

lowering said vessel to a subsurface location;

measuring, by use of said gradiometers, at least one horizontal component of vector current density in the adjacent subsurface;

measuring, by use of said magnetometers, a horizontal magnetic field component in at least one perpendicular direction relative to said vector current density;

determining electrical conductivity in the immediate vicinity of said vessel;

and utilizing said measured and determined quantities, as a function of frequency of the electromagnetic field, including said electrical conductivity in the immediate vicinity of said vessel for determining the impedance of said underlying and surrounding subsurface region.

7. A method as in claim 6 where in said utilizing step an electric field vector "E" is computed by use of said measured vector current density and said determined conductivity.

* * * * *